Patented Nov. 17, 1925.

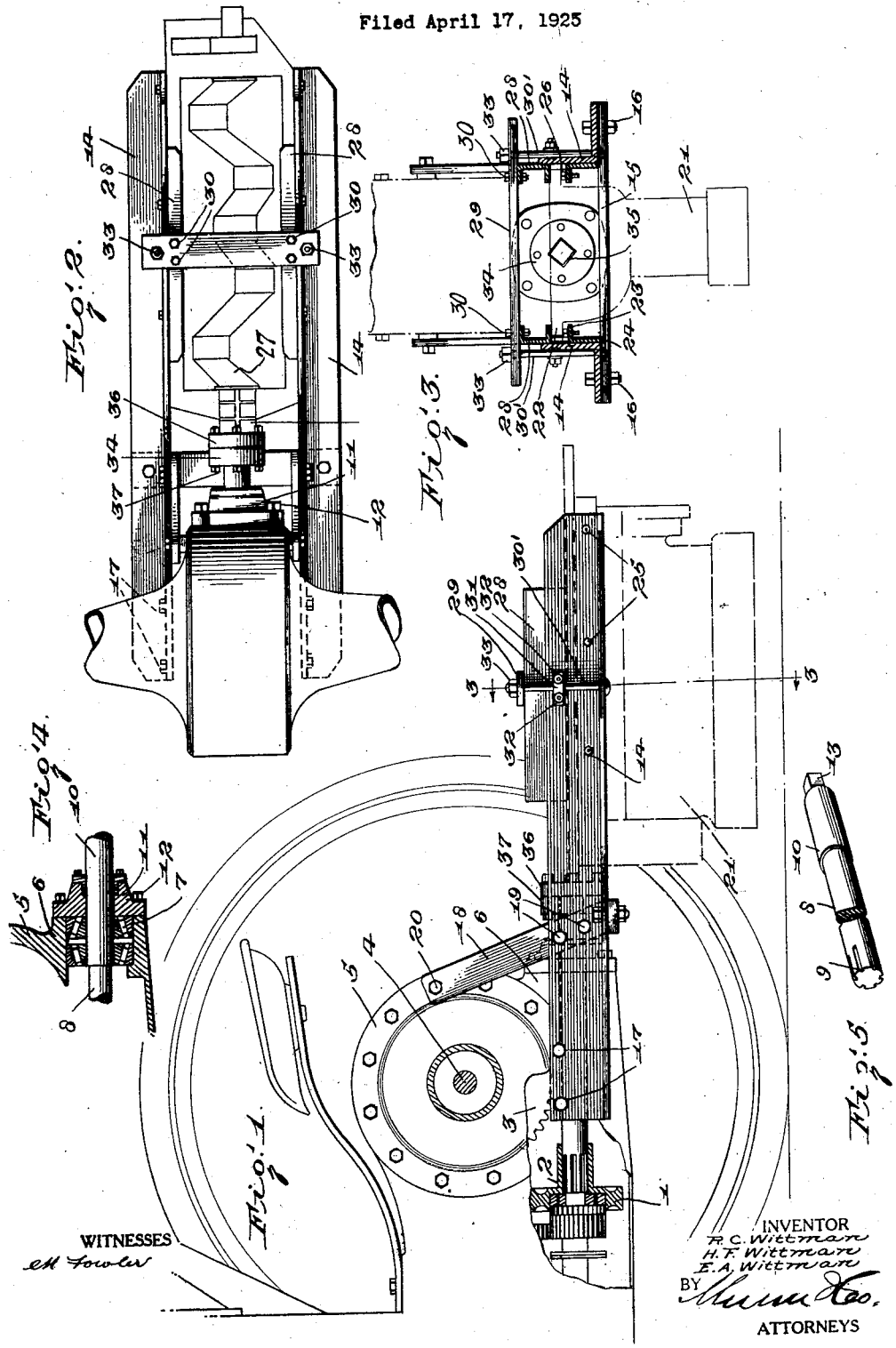

1,561,964

UNITED STATES PATENT OFFICE.

RICHARD C. WITTMAN, HILARY FRANCIS WITTMAN, AND EDWIN ANTHONY WITTMAN, OF ST. MARYS, PENNSYLVANIA.

TRACTOR ATTACHMENT FOR BURNING IN BEARINGS.

Application filed April 17, 1925. Serial No. 23,986.

*To all whom it may concern:*

Be it known that we, RICHARD C. WITTMAN, HILARY F. WITTMAN, and EDWIN A. WITTMAN, citizens of the United States, and residents of St. Marys, in the county of Elk and State of Pennsylvania, have invented certain new and useful Improvements in Tractor Attachments for Burning in Bearings, of which the following is a specification.

Our invention relates to the burning in of the bearings of a motor for the purpose of securing a desirable uniformity and smoothness of contact surfaces in the bearings, and it consists in the combinations, constructions and arrangements herein described and claimed.

An object of the invention is the provision of an attachment for a tractor of a well known type of construction which will afford facilities for making use of the motive power of the tractor to burn in the bearings of a motor.

A further object of the invention is the provision of an attachment of the character described which includes a frame structure for supporting an engine block so that the crank shaft of the engine will be supported firmly in position to be coupled to a drive shaft of the tractor in alinement with the drive shaft and the engine block will be held substantially rigid with the housing of the drive shaft of the tractor so that the bearings of the engine will be burned in uniformly.

A still further object of the invention is the provision in an attachment of the character described of a novel and efficient means for coupling the crank shaft of an engine to a rotating part of the power plant of the tractor so that the crank shaft will be turned in its bearings when the power plant of the tractor is operated without any power being transmitted to the tractor wheels.

Other objects and advantages of the invention will be apparent from the following description, considered in conjunction with the accompanying drawings, in which:—

Figure 1 is a fragmentary side elevation of the rear end portion of a tractor equipped with an attachment embodying the invention, portions of the housing of the tractor being broken away to show internal parts and a transmission gear of the tractor power plant being shown in section, Figure 2 is a plan view showing the attachment secured in place on the rear portion of the tractor and showing an engine block supported by the attachment and the crank shaft of the engine coupled to a rotating part of the tractor power plant, Figure 3 is a section substantially along the line 3—3 of Figure 1, Figure 4 is a fragmentary vertical section showing a portion of the drive shaft housing of the tractor together with a thrust bearing and a stuffing box through which the drive shaft extends, and Figure 5 is a perspective view of a drive shaft which the invention provides in lieu of the usual worm shaft of the tractor.

In Figure 1, we show the rear portion of a tractor of a well known type of construction. The power plant of this tractor includes a transmission gear 1 which is supported within the tractor body and which has a rearwardly extending hub 2 for the reception of the forward end portion of the tractor drive shaft. The usual tractor drive shaft is not shown but as is well known, such tractor drive shaft has longitudinal grooves in its front end portion for engaging with splines carried internally by the hub 2 so that the drive shaft will turn with the transmission gear 1. The usual tractor drive shaft also is provided with a worm in mesh with a worm gear 3 from which motion may be transmitted through the usual differential, not shown, to the rear axle shaft 4 of the tractor and then to the tractor wheels. The worm wheel 3 is housed within a worm wheel housing 5 which may be integral with a tubular housing 6 in which is disposed the usual worm thrust bearing unit, as at 7 in Figure 4.

The parts described so far are ordinary parts of a tractor of a well known type of construction and form no part of the present invention except in so far as they cooperate with the parts which will now be described.

In carrying out the invention, we remove the usual worm provided drive shaft of the tractor and substitute therefor a drive shaft 8 which has the forward end portion thereof provided with the longitudinal grooves 9 for engaging with the splines in the hub of the transmission gear 1 so that the drive shaft 8 will rotate in unison with the transmision gear 1. The drive shaft 8 is out of engagement with the teeth of the worm wheel 3 and has the rearward end portion thereof, which may be enlarged as shown at 10, supported in the bearing unit 7 and in a stuffing box 11 which is secured by fastening devices, such as the bolts 12, to the rear end of the drive shaft housing 6 in the place of the usual draw bar cap, not shown. The drive shaft 8 protrudes from the stuffing box 11 and has the extreme rear end portion thereof formed to be square in cross sectional contour as indicated at 13.

The supporting frame of the attachment comprises a pair of elongated side bars 14, each of which is angular in cross section. These side bars 14 are connected by a lower cross bar 15 which has the opposite end portions thereof disposed flatwise against horizontal flanges of the side bars 14 and secured rigidly to the latter by bolts and nuts indicated at 16 or like fastening devices. With this arrangement, the side bars 14 will have the horizontal flanges thereof turned laterally outward and will have the vertical flanges thereof parallel with each other. These parallel vertical flanges are secured to opposite sides of the drive shaft housing 6 at the juncture of the drive shaft housing with the worm wheel housing and the side bars 14 are further stayed to the drive shaft housing and worm wheel housing structure by a pair of inclined stay bars 18 which have the lower end portions thereof secured rigidly by bolts 19 or like fastening devices to the vertical flanges of the side bars 14 adjacent to the forward ends of the latter, the upper end portions of the stay bars 18 being secured by bolts 20 to the worm wheel housing at opposite sides of the latter. The bolts 20 may be ordinary parts of the worm wheel housing construction.

The lower cross bar 15 connects the side bars 14 forwardly of the middle points of the side bars.

Space thus is provided between the side bars 14 rearwardly of the cross bar 15 for a considerable portion of an engine block 21 which has an outwardly turned rim flange 22 at its upper end supported upon the inturned flanges 23 of angular supporting rails 24 which are secured by fastening devices, such as the bolts and nuts 25 to the vertical flanges of the side bars 14 of the supporting frame of the attachment. The inturned flanges 23 of the rails 24 may be provided with adjusting devices such as the cap bolts 26 which are arranged at intervals along each flange 23 and have the heads thereof disposed above the flange 23 and their shanks in threaded engagement with vertical openings in the flange 23. The hereinbefore mentioned outwardly extending rim flange at the upper end of the engine block rests upon the heads of the bolts 26 and it is obvious that the respective bolts 26 may be adjusted as desired to support the engine block so that the axis of the crank shaft 27 of the engine will be in alinement with the drive shaft 8, even though irregularities of surface may exist in the rim flange 22 of the engine block or in the flanges 23 of the supporting rails. The engine block is clamped in position on the rails by a pair of parallel clamping members 28 which are adapted to slide downwardly between the upper end portions of the vertical flanges of the side bars 14 to and from position to rest upon the rim flange 22 of the engine block. The clamping members 28 are connected together for movement as a unit by means of an upper cross bar 29 to which the clamping bars 28 are rigidly secured by bolts and nuts as indicated at 30 or like fastening devices. The clamping members 28 are shown as being channel bars secured to the cross bar 29 so that the flanges of the clamping members are horizontal and the lower flanges of the clamping members will rest flatwise on the rim flange of the engine block and an effective clamping action will be secured when pressure is applied to the clamping members 28. The end portions of the cross bar 29 extend laterally of the clamping members 28 and have vertical openings for the reception of the upper end portions of tie bolts 30′ which are extended upwardly through openings in the horizontal flanges of the side bars 14 and are clamped to the outer sides of the vertical flanges of the side bars 14 by straps 31 and fastening devices 32. Nuts 33 are in threaded engagement with the upper end portions of the tie bolts 30′ and can be manipulated to exert pressure on the upper cross bar 29 and thence through the clamping members 28 upon the rim flange at the upper end of the engine block, whereby the latter will be held firmly in place on the rails 24 after the adjusting devices 26 have been adjusted to assure alinement of the axis of the crank shaft 27 with the axis of the drive shaft 8. The drive shaft 8 is connected with the crank shaft 27 by means of a coupling plate 34 which is shown as being circular in outline and as having a central opening 35 which conforms in outline to the cross sectional contour of the non-circular end portion 13 of the drive shaft and is adapted to receive the latter. The plate 34 is secured flatwise to the usual flange 36 on the adjacent end of the crank shaft by means of fastening devices such as the bolts and nuts indicated at 37, said bolts extending through alined openings in the flange 36 and the coupling plate 34. The opening 35 is slightly larger in cross section than the non-circular end portion 13 of the shaft 8 so that slight play between the shaft 8 and the coupling plate 34 is permitted and a very slight rotational movement of the shaft 8 will not cause rotation of the crank shaft. However, any considerable rotational movement of the shaft 8 will cause the turning of the crank shaft in its bearings and such bearings therefore will be burned in when the power plant of the tractor is operated in the usual manner to cause rotation of the shaft 8. The various speeds of the power plant of the tractor may be utilized as is desired during the operation of burning in the bearings.

The substitution of the shaft 8 for the usual worm drive shaft of the tractor can be effected quickly and easily and the usual worm shaft of the tractor can be placed with equal facility so that but little time and labor are required to secure the attachment to the tractor so that the motive power of the tractor can be utilized to burn in the bearings. When the bearings have been burned in, the attachment can be detached quickly and easily from the tractor and the tractor will be adapted for use in performing the usual functions of a tractor when the drive shaft 8 is replaced by the usual worm drive shaft and the stuffing box 11 is replaced by the usual draw bar cap of the tractor.

Obviously, our invention is susceptible of embodiment in forms other than that herein described, and we therefore consider as our own all such modifications and adaptations of the form of the device herein described that fairly fall within the scope of the appended claims.

We claim:—

1. An attachment of the character described comprising a frame attachable to a fixed part of the rear end structure of a tractor, said frame being adapted to support an engine block, a shaft adapted to replace the usual worm drive shaft of the tractor, said substitute shaft being disconnected from the usual worm wheel of the transmission mechanism of the tractor, and means for coupling the crank shaft of said engine block to said substitute drive shaft.

2. An attachment of the character described comprising a pair of side frame members, each being right angular in cross section, corresponding flanges of said side members being vertical and the remaining flanges of said side members being horizontal and turned laterally outward, a pair of rails secured to said side members on the inner faces of the vertical flanges of said side members, said rails being adapted to have the laterally enlarged upper end portion of an engine block supported thereon, clamping means adjustably connected with the horizontal flanges of said side members and engageable with the upper side of said engine block to hold said engine block on said rails, means securing said side members to a fixed part of the structure of a tractor at the rear end of the latter and at opposite sides of the housing of the drive shaft of the structure, and means replacing the usual draw bar cap and the usual worm drive shaft of the tractor for connecting the crank shaft of said engine block with a rotating part of the transmission mechanism of said tractor.

3. An attachment of the character described comprising a pair of side frame members, each being right angular in cross section, corresponding flanges of said side members being vertical and the remaining flanges of said side members being horizontal and turned laterally outward, a pair of rails secured to said side members on the inner faces of the vertical flanges of said side members, said rails being adapted to have the laterally enlarged upper end portion of an engine block supported thereon, clamping means adjustably connected with the horizontal flanges of said side members and engageable with the upper side of said engine block to hold said engine block on said rails, means securing said side members to a fixed part of the structure of a tractor at the rear end of the latter and at opposite sides of the housing of the drive shaft of the tractor, a stuffing box secured to the outer end of said drive shaft housing in the place of the usual draw bar cap, a drive shaft replacing the usual worm drive shaft of the tractor, said substitute drive shaft extending through said stuffing box and having the rear end portion thereof formed to be non-circular in cross sectional contour, and a coupling plate attached to the forward end of the crank shaft of said engine and having a non-circular central opening engaged with the non-circular rear end of said substitute drive shaft.

4. In an attachment of the character described, a supporting frame comprising a pair of side bars, a pair of rails secured to said side bars and carried on the inner faces of the latter, said rail having inwardly extending flanges at their upper ends adapted to extend inwardly beyond the outer edge of the flange at the upper end of an engine block which is disposed between said side bars, rest members adjustably engaged with said inturned flanges of the rails for spacing said rim flange of the engine from the upper faces of said inturned flanges of the rails, clamping members movable vertically to and from position to rest upon said engine block above said rails, a cross bar connecting said clamping members, and means adjustably connecting said cross bar with said side members of the supporting frame and operable to tighten said clamping members against said engine block.

5. In an attachment of the character described, a supporting frame comprising a pair of side bars, a pair of rails secured to said side bars and carried on the inner faces of the latter, said rails having inwardly extending flanges at their upper ends adapted to extend inwardly beyond the outer edge of the flange at the upper end of an engine block which is disposed between said side bars, rest members adjustably engaged with said inturned flanges of the rails for spacing said rim flange of the engine from the upper faces of said inturned flanges of the rails, clamping members movable vertically to and from position to rest upon said engine block above said rails, a cross bar connecting said clamping members, means adjustably connecting said cross bar with said side members of the supporting frame and operable to tighten said clamping members against said engine block, a lower cross bar connecting said side members of the frame, and tie bars connected to the forward end portions of said side bars and adapted to connect said side bars with the worm gear housing at the rear end of a tractor.

RICHARD C. WITTMAN.
HILARY FRANCIS WITTMAN.
EDWIN ANTHONY WITTMAN.